UNITED STATES PATENT OFFICE.

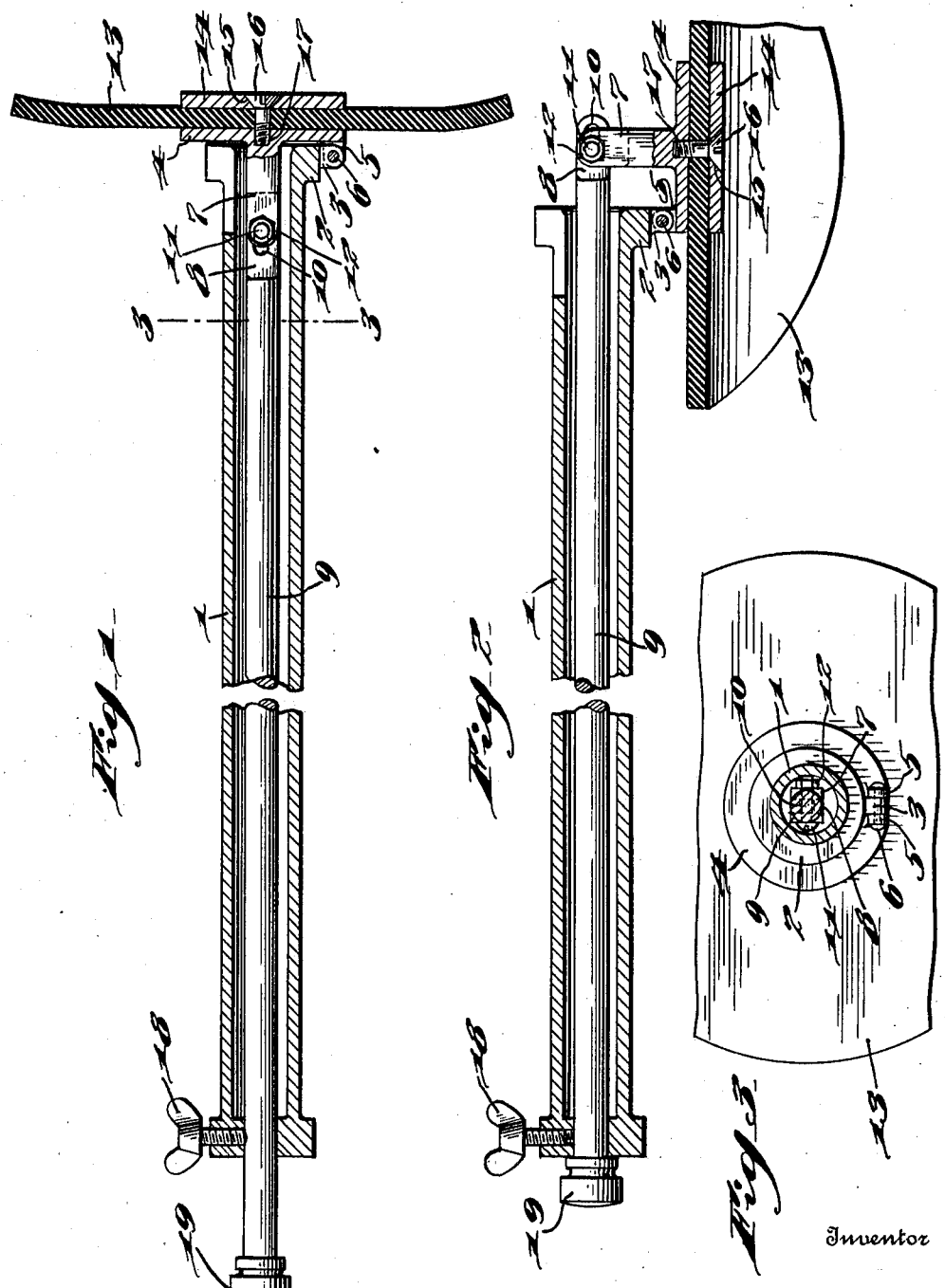

NATHAN B. GRIFFITH, OF PHILADELPHIA, PENNSYLVANIA.

CLEAN-OUT PLUNGER.

1,004,161.  Specification of Letters Patent.  Patented Sept. 26, 1911.

Application filed April 10, 1911.  Serial No. 620,126.

*To all whom it may concern:*

Be it known that I, NATHAN B. GRIFFITH, a citizen of the United States, residing at Philadelphia, in the county of Philadelphia and State of Pennsylvania, have invented certain new and useful Improvements in Clean-Out Plungers, of which the following is a specification.

My invention relates to improvements in clean out plungers, the object of the invention being to provide a device of this kind having a disk or sucker, which may be moved at an angle to the pipe or tube supporting the same, and which may be compressed or bowed so as to pass through a hopper, and then turn to normal position to exert its full sucking action.

A further object is to provide an improved device of this character of extreme simplicity, of maximum strength and durability, and which may be easily manipulated to move the sucker to either of its positions.

With these and other objects in view, the invention consists in certain novel features of construction and combinations and arrangements of parts, as will be more fully hereinafter described and pointed out in the claims.

In the accompanying drawings: Figure 1, is a broken view in longitudinal section illustrating my improvements in normal operative position. Fig. 2, is a similar view showing the sucker moved to a position approximately parallel with the tubular handle and rod for an insertion through a restricted hopper, and Fig. 3, is a broken view on the line 3—3 of Fig. 1.

1, represents a tubular handle which is provided with an annular enlargement 2 at one end having a parallel perforated ear 3 thereon as shown.

4, is a metal disk which is provided at one side with a perforated ear 5 positioned between the ears 3 and connected by a hinge pin 6, so as to hinge disk 4 to the end of tubular handle 1. On this disk 4, adjacent its center, a bifurcated post 7 is made integral, and the bifurcated end of this post receives the restricted end 8 of a rod 9. This rod 9 projects entirely through handle 1, and is provided with an elongated slot 10 for the reception of a bolt 11, which projects through the bifurcated end of post 7, and is securely held by a nut 12.

A rubber or other flexible disk 13 is positioned against metal disk 4, and a metal disk 14 is positioned against the outer face of disk 13, and is provided with an opening 15 to countersink the head of the screw 16, which latter is projected through the disk 13, and screwed into a threaded socket 17 in disk 4.

While I refer to the part 13 as a flexible disk, it is to be understood that this flexible disk constitutes the plunger or sucker, and I use these terms indiscriminately to mean the same part.

Rod 9 is clamped at various positions in the handle 1 by means of a thumb screw 18, and said rod is preferably provided with a knob or hand hold 19 to facilitate the movement of the rod.

In operation, when it is desired to position the clean out plunger in a clean out pipe, rod 9 is moved longitudinally so as to position the parts as shown in Fig. 2. Disk 13 is then compressed or curved, so that it may be forced through a relatively small hopper. When through the hopper, and into the pipe, rod 9 is pulled longitudinally so as to position the parts as shown in Fig. 1, when thumb screw 18 is operated to clamp the rod. The plunger is then operated as plungers are ordinarily operated to reciprocate in the pipe, and dislodge the obstruction. When it is desired to remove the plunger, it is necessary to again return the parts to the position shown in Fig. 2, when the plunger may be readily drawn out of the hopper.

By providing a construction of this kind, it is not necessary to separate the hopper from the drain pipe in order to dislodge obstructions in the latter, because by reason of the flexibility of disk 13, and the position which it may assume, it may pass through any ordinary size of hopper.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a device of the character described, the combination with a tubular handle, a metal disk hinged at one edge to said tube and normally positioned across the end of the tube, a post on said disk, a rod projecting through the tubular handle and having a slot and pin connection with said post, means for locking said rod at various positions in the handle, and a flexible disk of greater diameter than the metal disk, and secured to said metal disk, substantially as described.

2. In a device of the character described, the combination with a tubular handle, a metal disk hinged at one edge to said tube and normally positioned across the end of the tube, a post on said disk, a rod projecting through the tubular handle and having a slot and pin connection with said post, means for locking said rod at various positions in the handle, a second metal disk of approximately the same diameter as the first-mentioned metal disk, said last-mentioned metal disk having an opening registering with the screw-threaded socket in said first-mentioned disk, a flexible disk of greater diameter than the metal disks positioned between said metal disks, and a screw located in said opening and said socket, and projected through said flexible disk, substantially as described.

In testimony whereof I have signed my name to this specification in the presence of two subscribing witnesses.

NATHAN B. GRIFFITH.

Witnesses:
R. H. KRENKEL,
CHARLES E. POTTS.

---

Copies of this patent may be obtained for five cents each, by addressing the "Commissioner of Patents Washington, D. C."